United States Patent [19]

Shannon

[11] Patent Number: 5,328,068
[45] Date of Patent: Jul. 12, 1994

[54] AUTOMOBILE CLOTHES HANGER BRACKET

[76] Inventor: Brian P. Shannon, 7159 Neff, Houston, Tex. 77074

[21] Appl. No.: 992,253

[22] Filed: Dec. 14, 1992

[51] Int. Cl.$^5$ .............................................. B60R 7/00
[52] U.S. Cl. ............................ 224/42.46 A; 224/313; 211/113; 223/85; 223/DIG. 4
[58] Field of Search ............... 224/42.45 A, 42.46 A, 224/313; 211/113, 116, 119; 223/85, 92, DIG. 4; 194/141, 142, 143

[56] References Cited

U.S. PATENT DOCUMENTS

| | | | |
|---|---|---|---|
| 2,344,339 | 3/1944 | Zwald | 224/42.45 A |
| 2,782,974 | 3/1957 | Borgfeldt | 294/143 |
| 3,017,059 | 1/1962 | Dzienisewicz | 223/DIG. 4 |
| 3,138,259 | 6/1964 | Sitt | 211/113 |
| 3,317,055 | 5/1967 | Roscicki | 294/143 |
| 3,666,149 | 5/1972 | Woodhull | 223/DIG 4 |
| 3,831,826 | 8/1974 | Thomas | 211/119 |
| 4,778,089 | 10/1988 | White et al. | 224/42.46 A |

Primary Examiner—Linda J. Sholl
Attorney, Agent, or Firm—Kenneth A. Roddy

[57] ABSTRACT

A removable clothes hanger bracket for mounting on the grab bar or grab handle in the interior of a vehicle to increase garment carrying capacity, and to protect the grab handle, interior headliner, and trim molding of the vehicle from damage that results when wire and plastic clothing hangers are hung directly on the grab handle. The bracket has a rack with an arcuate lower portion and a generally straight top portion extending between the upper ends of the arcuate portion forming an open reclining D-shaped configuration. Two opposed hook members are pivotally connected to the top portion of the rack intermediate the ends and close to form a closed loop around the vehicle grab handle. When properly installed, the rack is positioned beneath the grab handle with its top portion generally horizontal with one end extending outwardly toward the vehicle side door or window and the opposed end extending inwardly toward the vehicle interior. The rack top portion and the arcuate lower portion have a plurality of spaced hanger-receiving elements to receive a plurality of clothes hangers. The hook members are spaced apart and positioned on the rack so as to equally distribute the weight of the suspended garments along the length of the grab handle and to prevent the rack from twisting relative to the grab handle.

9 Claims, 4 Drawing Sheets

AUTOMOBILE CLOTHES HANGER BRACKET

BACKGROUND OF THE INVENTION

1. Field of the Invention

This invention relates generally to garment hanger brackets for installation in automobile interiors, and more particularly to a clothes hanger bracket having a generally arcuate rack for receiving conventional clothes hangers which is supported on the grab handle in the interior of an automobile.

2. Brief Description of the Prior Art

Many foreign automobiles are not equipped with the conventional small clothing garment hooks found in most domestic automobiles and which are located near the ceiling above the rear side windows or rear portion of the vehicle. Instead, the majority of foreign automobiles, and some domestic automobile models, have a grab bar or grab handle located near the ceiling, or on the ceiling, above the rear side windows of the vehicle. Some of these grab handles have a very small hook attached to them from which one or two, at most, wire clothes hangers may be suspended. Because the small hooks are incapable of holding a large number of garments, they are not functional for use when traveling, picking up garments from the dry cleaners, and other times when large hanging capacity is desired.

In an attempt to overcome the hanging capacity problem, vehicle owners often hang their clothing garments, on hangers, directly over and through the grab handles located in the vehicles. Due to the design and location of these grab handles in relationship to the ceiling of the vehicle, it is often difficult, and on some vehicles impossible, to pass the hook of the conventional clothes hanger through the opening between the grab handle and the ceiling (headliner) of the vehicle in which it is attached. Also, during installation and removal of the conventional clothes hangers from the grab handle, the clothes hangers, especially the ones made of wire will sometimes scrape, damage, or tear the vinyl and leather material from which the grab handles are made and also the vinyl or cloth material from which the ceiling or headliner is made. The direct contact and sliding movement of the conventional clothes hangers against the surfaces of the grab handle also has a tendency to wear, tear, crack, and damage the grab handles. For these reasons, many vehicle owners will not place (hang) clothes hangers directly over and on the grab handles in the vehicles.

Even if the vehicle owner does place conventional clothes hangers on the grab handles, the garments tend to be pushed against the windows and doors of the vehicle, due to the position of the grab handle in the vehicle, thus wrinkling and possibly soiling the garments. Since the garments hang perpendicular to the grab handle and parallel to the back of the vehicle, they also have a tendency to obstruct a good portion of the driver's view through the rear window of the vehicle and limit the useful seating capacity of the back seat.

Devices are known which can be attached to the existing clothes hooks, located in most domestic automobiles, to increase the hanging capacity. One common garment hanging device is an elongate bar which is supported at opposite ends on the existing hooks and extends from side-to-side across the rear portion of the automobile. However, this type of garment hanging device requires existing side clothes hooks, which are not provided in most foreign automobiles with grab handles, and the foreign models which do have small hooks on the grab handle locate the small and fragile plastic hooks such that the grab handles will not allow attachment of the bar, or will not support the weight of the clothing to be placed on the bar. This type of device also obstructs the drivers view through the rear window, and prevents use of the back seat for passengers. U.S. Pat. Nos. 2,532,907 and 2,617,571 to Hart disclose other bar type garment hanging devices.

Seidler, U.S. Pat. No. 2,528,794 and Kramer, U.S. Pat. No. 2,728,503 disclose garment hangers which require installation and adaptation to a vehicle's interior, thus allowing the hanging of clothing garments in vehicles in which no factory installed clothing hook is provided, but these hanging devices are extremely mechanical and complex in construction, and would not be practical in modern automobiles.

Shannon, U.S. Pat. No. 5,104,083 and Gabbert, U.S. Pat. No. 4,863,081 disclose garment hangers with adaptable depth adjustment mechanisms, so as to fit the various interior trim angles on which fixed garment hooks are usually located on in domestic model vehicles, but their use and adaptability to the small garment hooks often located on grab handles is impossible due to the distance at which the grab handles are located away from the trim or ceiling of the automobile.

White et al, U.S. Pat. No. 4,778,089 discloses a telescoping rod which is adapted to be supported from and beneath an interior grab handle of the vehicle. This device, lacks lateral support and is subject to swinging or pivoting when garments are placed on it and the vehicle is in motion. Also, the device, due to its concentrated weight at the portion of the invention in which the adjustment brace is located, will not stay attached to the grab handle unless or until weight (garments) is placed on the opposite end of the device, thus limiting its stability. The device also requires a horizontal portion of the interior trim above the window frame to contact and support an adjustable brace. However, in the majority of foreign and domestic automobiles with interior grab handles there is no horizontal portion of the trim or, if it does exist, it is too small of an area of contact and the device has a tendency to slide off of the horizontal portion of the trim and pivot the rod end supporting the garments downward and dump the garments into the back seat of the automobile.

The present invention is distinguished over the prior art in general, and these patents in particular by a removable clothes hanger bracket for mounting on the grab bar or grab handle in the interior of a vehicle to increase garment carrying capacity, and to protect the grab handle, interior headliner, and trim molding of the vehicle from damage that results when wire and plastic clothing hangers are hung directly on the grab handle. The bracket has a rack with an arcuate lower portion and a generally straight top portion extending between the upper ends of the arcuate portion forming an open reclining D-shaped configuration. Two opposed hook members are pivotally connected to the top portion of the rack intermediate the ends and close to form a closed loop around the vehicle grab handle. When properly installed, the rack is positioned beneath the grab handle with its top portion generally horizontal with one end extending outwardly toward the vehicle side door or window and the opposed end extending inwardly toward the vehicle interior. The rack top portion and the arcuate lower portion have a plurality of spaced hanger-receiving elements to receive a plurality of clothes hangers. The hook members are spaced apart and positioned on the rack so as to equally distribute the weight of the suspended garments along the length of the grab handle and to prevent the rack from twisting relative to the grab handle.

SUMMARY OF THE INVENTION

It is therefore an object of the present invention to provide an automobile clothes hanger bracket adapted to be received on the existing grab handle or grab bar of a vehicle which will greatly increase the number of garments which can be hung therefrom.

It is another object of this invention to provide an automobile clothes hanger bracket adapted to be received on the existing grab handle of a vehicle and is universally adapted to fit the different widths of existing interior grab handles.

Another object of this invention is to provide an automobile clothes hanger bracket adapted to be received on the existing grab handle of a vehicle regardless of the location of the grab handle in relation to the interior trim moldings and ceiling headliner.

Another object of this invention is to provide an automobile clothes hanger bracket adapted to be received on the existing grab handle of a vehicle which is configured to receive and support garment hangers in a position parallel with the door and window of the vehicle and prevent wrinkling and soiling of the garments.

Another object of this invention is to provide an automobile clothes hanger bracket adapted to be received on the existing grab handle of a vehicle such that the clothing garments hang parallel to the interior side of the automobile door and do not obstruct the rear view of the driver.

Another object of this invention is to provide an automobile clothes hanger bracket adapted to be received on the existing grab handle of a vehicle which is quickly and easily attached and removed from the grab handle.

Another object of this invention is to provide an automobile clothes hanger bracket adapted to be received on the existing grab handle of a vehicle which is strong and lightweight, and can be easily stored in the glove box or center console of an automobile when not being used.

Another object of this invention is to provide an automobile clothes hanger bracket which is received and securely supported in a stable position on the existing grab handle of a vehicle, either with or without garment weight supported thereon, and which will not pivot or sway as the vehicle moves.

Another object of this invention is to provide an automobile clothes hanger bracket adapted to be received on the existing grab handle of a vehicle such that the grab handle, interior trim molding, and ceiling headliner are not scraped, torn, worn, or damaged by the direct contact of conventional clothes hangers.

A further object of this invention is to provide an automobile clothes hanger bracket adapted to be received on the existing grab handle of a vehicle which is simple in construction, economical to manufacture, sturdy in construction, attractively complimentary in color to the interior trim molding and ceiling headliner of the vehicle, and rugged in use.

Other objects of the invention will become apparent from time to time throughout the specification and claims as hereinafter related.

The above noted objects and other objects of the invention are accomplished by a removable clothes hanger bracket for mounting on the grab bar or grab handle in the interior of a vehicle to increase garment carrying capacity, and to protect the grab handle, interior headliner, and trim molding of the vehicle from damage that results when wire and plastic clothing hangers are hung directly on the grab handle. The bracket has a rack with an arcuate lower portion and a generally straight top portion extending between the upper ends of the arcuate portion forming an open reclining D-shaped configuration. Two opposed hook members are pivotally connected to the top portion of the rack intermediate the ends and close to form a closed loop around the vehicle grab handle. When properly installed, the rack is positioned beneath the grab handle with its top portion generally horizontal with one end extending outwardly toward the vehicle side door or window and the opposed end extending inwardly toward the vehicle interior. The rack top portion and the arcuate lower portion have a plurality of spaced hanger-receiving elements to receive a plurality of clothes hangers. The hook members are spaced apart and positioned on the rack so as to equally distribute the weight of the suspended garments along the length of the grab handle and to prevent the rack from twisting relative to the grab handle.

DESCRIPTION OF THE PREFERRED EMBODIMENT

Figure 1:
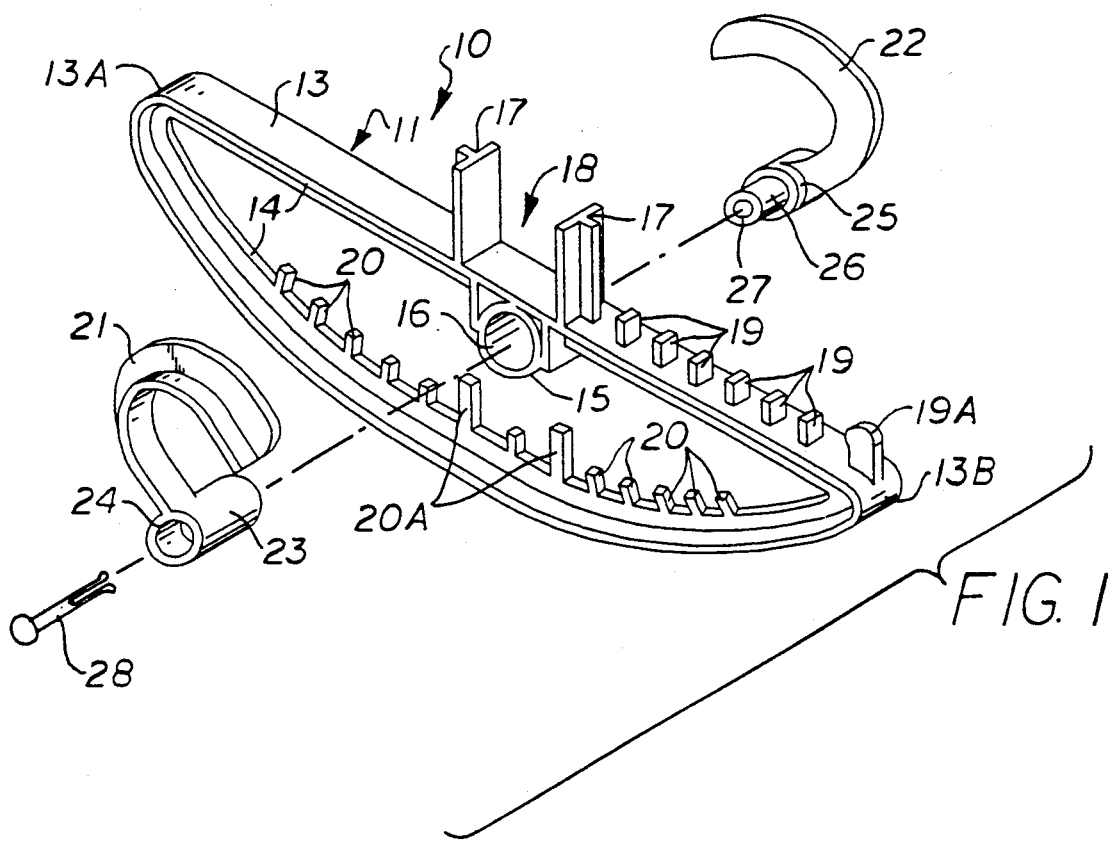
FIG. 1 is an exploded isometric view of the automobile clothes hanger bracket in accordance with the present invention shown in an unassembled condition.
Figure 2:
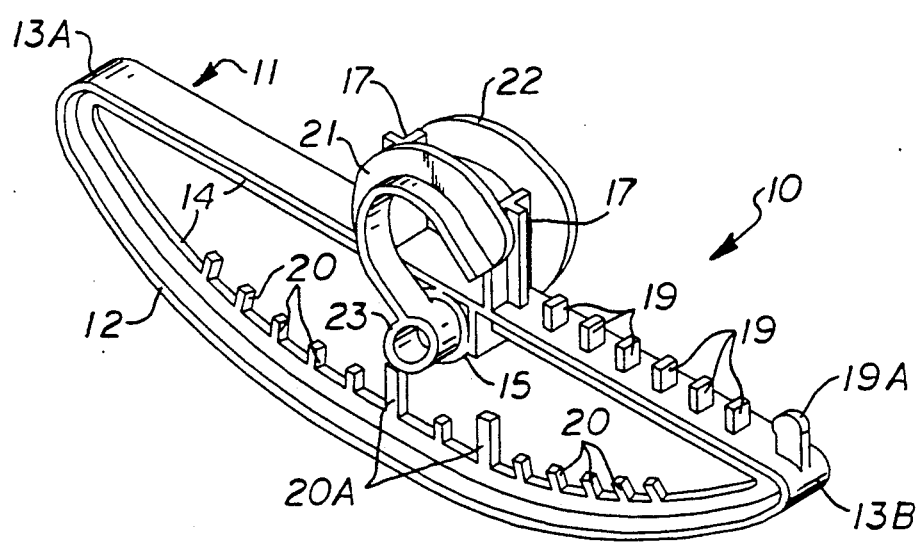
FIG. 2 is an isometric view of the automobile clothes hanger bracket in the assembled condition.

Referring to the drawings by numerals of reference, a preferred automobile clothes hanger bracket 10 is shown in FIG. 1 in an unassembled condition and in FIG. 2 in the assembled condition. The bracket 10 has a generally arcuate rack 11 having an arcuate lower portion 12 and a generally straight top portion 13 extending between the upper ends of the arcuate lower portion defining an open reclining D-shaped configuration. The arcuate lower portion 12 and top portion 13 are generally T-shaped in transverse cross section to form a central inwardly disposed raised web or rib 14 which runs along the interior of the open D-shaped configuration to strengthen and reinforce to the structure.

The top portion 13 has a transverse tubular portion 15 formed on its underside intermediate each end which has a central bore 16 extending therethrough. A pair of upstanding centralizer supports 17 extend perpendicular to the top surface of the top portion 13 of the rack 11 in opposed longitudinally spaced relation at the center of the top portion above the tubular portion 15. The centralizer supports 17 are also T-shaped in cross section with the flat surfaces facing one another to define an opening 18 therebetween.

A plurality of longitudinally spaced upstanding projections 19 formed on the top surface of the top portion 13 of the rack 11 extend along one side of the top portion with the outermost projection 19A being relatively longer than the others to receive caps, hats, belts, neckties, etc. A plurality of longitudinally spaced upstanding projections 20 are formed on the upstanding rib 14 of the arcuate lower portion 12 and extend toward the interior of the open D-shaped configuration. A pair of the lower projections 20A spaced apart at the center portion of the arcuate lower portion 12 are longer than the others.

A pair of generally C-shaped hook members 21 and 22 are installed in the central bore 16 of the tubular portion 15 of the rack 11 from opposite sides. The rack 11 and hook members 21 and 22 are preferably formed of rigid molded plastic. The first hook member 21 has a tubular shank portion 23 extending laterally outward to one side with a central bore 24. The second hook member 22 has a tubular shank portion 25 at its lower end extending laterally outward to one side and has a concentric tubular extension 26 extending outwardly from the shank portion 25 defining a radial shoulder therebetween. The outer diameter of the shank portions 23 and 25 are smaller than the diameter of the bore 16 through the tubular portion 15 of the rack member 11. The outer diameter of the tubular extension 26 of hook member 22 is smaller in diameter than the central bore 24 of the shank 23 of hook member 21. The tubular extension 26 of hook member 22 has a central bore 27. The interior of the central bore 24 of shank 23 and the central bore 27 of the tubular extension 26 are apertured to receive a push rivet 28.

The hook members 21 and 22 are installed in opposed relation through the central bore 16 of the tubular portion 15 of the rack 11. The shank portion 23 of hook member 21 is slidably received in one end of the bore 16 of the tubular portion 15 of the rack member 11 and the shank portion 25 of hook 22 is slidably received in the other end with the tubular extension 26 of hook 22 slidably received in the bore 24 of the shank portion 23 of hook 21. The push rivet 28 is installed through the central bore 24 of shank 23 and is anchored in the central bore 27 of the tubular extension 26 to secure the hook members 21 and 22 together.

The push rivet apertures formed inside the bores 24 and 27 are conventional in the art of plastic molding and assembly and are therefore not shown. It should be understood that the hooks may also be secured together by other means conventional in the art of plastic molding and assembly. The relative diameters of the central bore 16 through the tubular portion 15 of the rack 11, and the outer diameter of the shanks 23 and 25 are such that when assembled together, the shanks form a continuous shaft through the bore 16 with sufficient clearance therebetween to rotate therein and relative thereto. The relative diameters of the bore 24 through the shank 23 of hook 21 and the outer diameter of the tubular extension 26 of hook 22 are such that when assembled together, there is sufficient clearance therebetween so that the hooks 21 and 22 can rotate relative to each other. Thus, the hooks 21 and 22 rotate relative to one another and relative to the rack 11.

In this manner, the weight supported on the rack 11 when suspended by the hooks 21 and 22 is distributed throughout the tubular shanks of both hook members and the tubular portion 15 of the rack 11.

Figure 3:
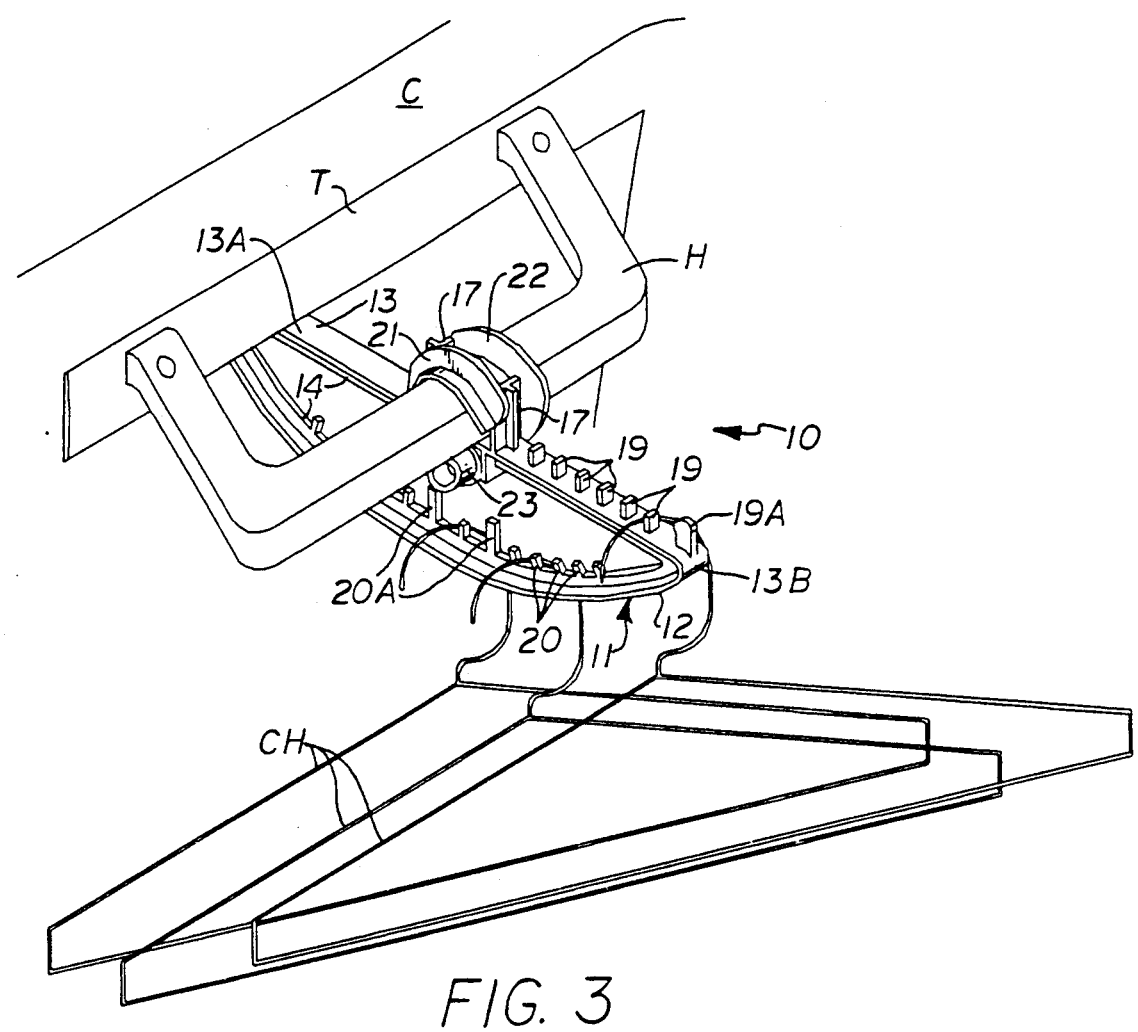
FIG. 3 is an isometric view of the automobile clothes hanger bracket installed on the automobile grab handle and pivoting under and against the interior trim.

The hooks 21 and 22 are laterally spaced from each other and the curved portions of each hook face each other and when viewed from the side in the closed position will encircle the opening 18 between the opposed upstanding centralizing supports 17. As seen in FIG. 3, the opposed hook members 21 and 22 close to form a closed loop around the vehicle grab handle H. When properly installed (as explained hereinafter), the rack 11 is positioned beneath the grab handle H with its top portion generally horizontal with one end 13A extending outwardly to engage the vehicle trim T and the opposed end extending inwardly toward the vehicle interior. The hook members 21 and 22 are spaced apart and positioned on the rack 11 so as to equally distribute the weight of the suspended garments along the length of the grab handle H and to prevent the rack from twisting from its perpendicular position.

INSTALLATION

Figure 4:
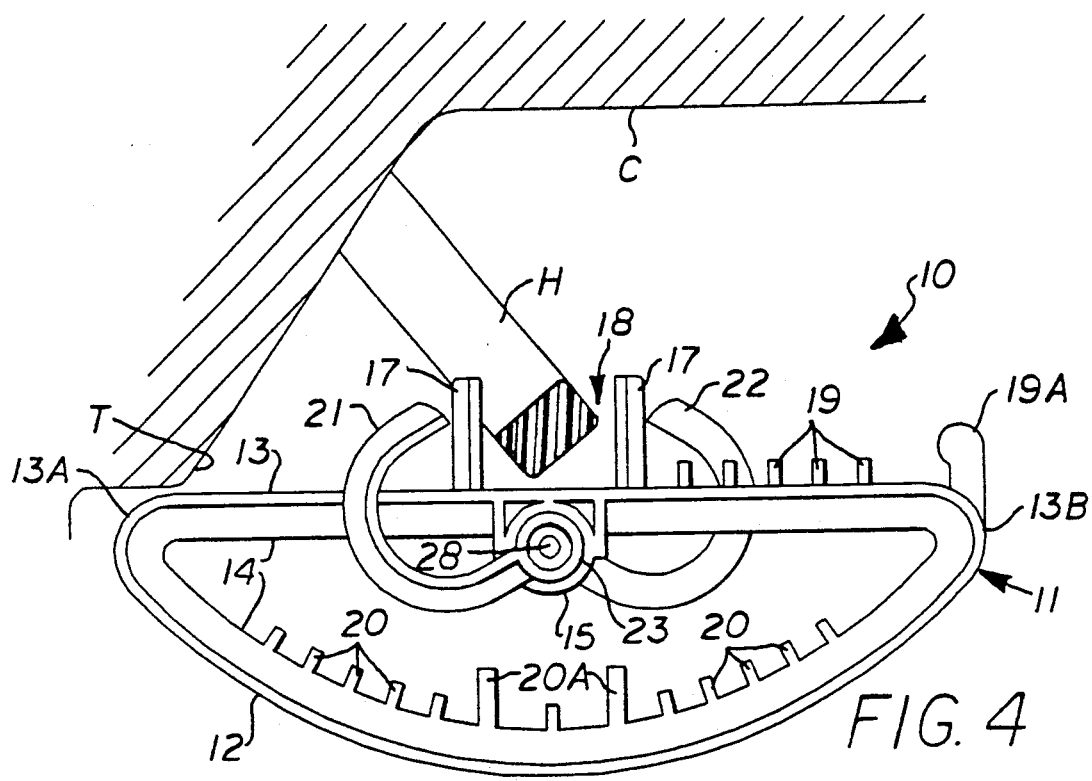
FIG. 4 is a side elevation view of the automobile clothes hanger bracket with the grab handle shown in transverse cross section showing the hook members in a retracted open position during installation on the hand grip portion of the grab handle.
Figure 5:
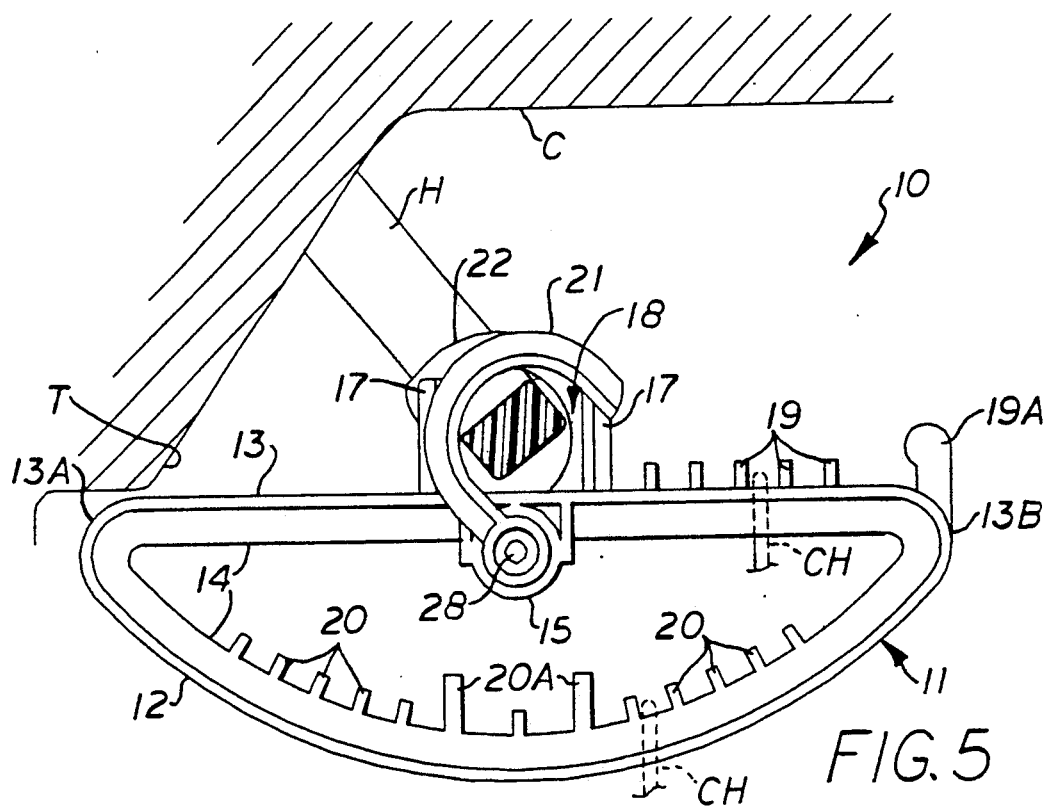
FIG. 5 is a side elevation view of the automobile clothes hanger bracket with the grab handle shown in transverse cross section showing the hook members in a closed position forming a closed loop around the hand grip portion of the grab handle and how the bracket can pivot against the interior trim molding of the vehicle when the grab handle protrudes from the side of the ceiling.

Referring now to FIG. 4, the hook members 21 and 22 are rotated (pivoted) apart to an open position such that the opening 18 between the two centralizer supports 17 of the rack 11 is clear and the bracket 10 is moved upwardly to allow the longitudinal portion of the grab handle H to be received within the opening. Once the grab handle H is received within the centralizer supports 17 of the rack 11 and positioned up against the top portion 13 of the rack 11, then the two hook members 21 and 22 are rotated (pivoted) toward each other such that their opposed curved portions are positioned over and around the grab handle H, as is illustrated in FIG. 5. The clothes hanger bracket 10 can then be released so that the downward pull (weight) of the hanger bracket will automatically cause the hook members 21 and 22 to remain in the closed position such that the two hook members encircle and are supported on the longitudinal portion of the grab handle H, and maintain the clothes hanger bracket 10 in a sturdy support position beneath the longitudinal hand grip portion of the grab handle H.

With the clothes hanger bracket 10 in place on the grab handle H, the angle at which the straight top portion 13 of the rack 11 rotates about the longitudinal axis of the hand grip portion of the grab handle H depends upon the proximity and location of the grab handle H in relation to the interior trim molding T and ceiling headliner C of the automobile. If the grab handle H protrudes from the side of the interior trim molding T and/or ceiling headliner C, as is seen in FIG. 5, then the clothes hanger bracket 21 will rotate until the end 13A of the top portion 13 of the rack 11 contacts the surface of the interior trim molding T.

Since the size of the grab handle H, and its angle of projection from the ceiling headliner C, varies from automobile to automobile, the top portion 13 of the rack 11 having the projections 19 will remain horizontal in some installations, or may either angle slightly up or down from horizontal. In this situation, as is seen in FIG. 3, conventional clothes hangers CH can be placed on the top portion 13 between the projections 19 and/or inside the D-shaped configuration between the projections 20 on the arcuate lower portion 12.

Figure 6:
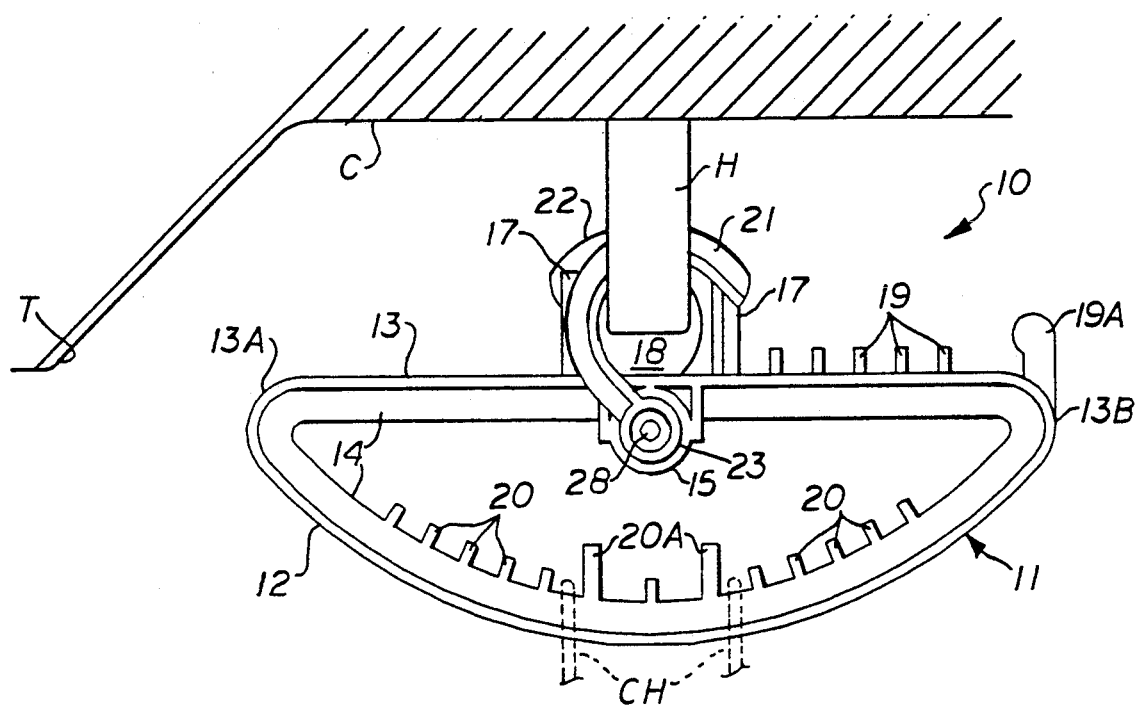
FIG. 6 is a side elevation view of the automobile clothes hanger bracket with hook members in a closed position around the hand grip portion of the grab handle illustrating how the bracket can position itself when the grab handle protrudes from the ceiling.

In some automobiles, the grab handle H extends downward from the top of the ceiling headliner C and is spaced a distance from the interior trim molding T as seen in FIG. 6. When the clothes hanger bracket 10 is installed on this type of grab handle, the top portion 13 of the rack 11 will not contact the interior trim molding T. In this situation, the clothes hanger bracket 10 will remain in a horizontal balanced position due to its symmetrical shape. The conventional clothes hangers CH should then be placed only inside the D-shaped configuration between the projections 20 on the arcuate lower portion 12. To keep the clothes hanger bracket 10 balanced during use so that the top portion 13 of the rack 11 remains horizontal in the vehicle, the clothes hangers CH and their attached garments should be weight distributed somewhat equally on both sides of the longer projections 20A on the arcuate lower portion 12.

With the clothes hanger bracket 10 installed in any of the positions described above, conventional wire or plastic clothes hangers CH may be hung and supported upon the rack 11 whereby garments, such as shirts and coats can be conveniently carried in the interior of an automobile or other vehicle. Caps, hats, belts, neckties, and the like may be hung from the longer projection 19A at the end 13B of the top portion 13 of the rack 11 if the top portion of the rack contacts the interior trim molding T. The clothes hanger bracket 10 may be left in place when not in use, or may be removed from the grab handle H and placed in either the glove box or the center console of an automobile.

To remove the clothes hanger bracket 10 from the grab handle H, if desired, the hook members 21 and 22 are rotated (pivoted) apart to the open position, as seen in FIG. 4, such that the opening 18 between the two centralizer supports 17 of the rack 11 is clear and the clothes hanger bracket is moved downward and away from the grab handle H.

While this invention has been described fully and completely with special emphasis upon a preferred embodiment, it should be understood that within the scope of the appended claims the invention may be practiced otherwise than as specifically described herein.

I claim:

1. A removable clothes hanger bracket for installation on the longitudinal hand grip portion of a grab handle in the interior of a vehicle to receive and support a plurality of conventional clothes hanger, having garments thereon comprising;
    a longitudinal rack member having an elongate generally straight top portion with opposite ends and an arcuate lower portion therebelow extending between the opposite ends of said straight portion defining an open reclining D-shaped configuration and a plurality of spaced hanger-receiving elements thereon for removably receiving and supporting a plurality of clothes hangers, and
    a pair of generally C-shaped curved hook members pivotally connected at their bottom ends to said rack member top portion intermediate the opposite ends thereof in laterally spaced apart and opposed facing relation and pivotal between an open position spread apart to receive the longitudinal hand grip portion of the grab handle and a closed position with the laterally spaced C-shaped portions overlapped and substantially encircling the longitudinal hand grip portion of the grab handle,
    said rack member being suspended by said overlapped hook members in a generally horizontal orientation centered beneath said grab handle with the longitudinal axis of said rack member perpendicular to the longitudinal axis of the longitudinal hand grip portion of the grab handle and the opposed ends of said rack member extending laterally to each side thereof, and
    said laterally spaced hook members in the overlapped and encircled position being laterally spaced apart a sufficient distance to distribute the garment weight supported by said rack member substantially along the length of the longitudinal hand grip portion of the grab handle when supported on the grip handle, and to prevent said rack member from twisting relative to the longitudinal axis of the grip handle.

2. The clothes hanger bracket according to claim 1 wherein
    the vehicle grab handle is of the type having a longitudinal hand grip portion closely adjacent to the trim molding of the vehicle, and
    one end of said rack member is configured to engage the adjacent trim molding when said rack member is suspended by said hook members beneath the grab handle and support said rack member in a generally horizontal orientation when a plurality of clothes hangers having garments thereon are supported on said hanger-receiving elements.

3. The clothes hanger bracket according to claim 1 wherein
    the vehicle grab handle is of the type having a longitudinal hand grip portion spaced a distance from the trim molding of the vehicle, and
    said hook members are generally centered between the opposite ends of said rack member such that said rack member is suspended by said hook members beneath the grab handle in a balanced generally horizontal orientation, and
    said hanger-receiving elements are positioned relative to said hook members, such that
    clothes hangers having garments thereon may be supported on said hanger-receiving elements with the garment weight distributed generally equally to maintain said rack in a balanced generally horizontal orientation.

4. The clothes hanger bracket according to claim 1 wherein
    one end of said rack member is configured to receive and support a hat or similar article.

5. The clothes hanger bracket according to claim 1 wherein
    said hanger-receiving elements comprise projections.

6. The clothes hanger bracket according to claim 1 wherein
    said rack member top portion has a plurality of longitudinally spaced hanger-receiving elements thereon for removably receiving and supporting a plurality of clothes hangers.

7. The clothes hanger bracket according to claim 1 wherein
    said rack member arcuate lower portion has a plurality of longitudinally spaced hanger-receiving elements thereon for removably receiving and supporting a plurality of clothes hangers.

8. The clothes hanger bracket according to claim 1 wherein
said rack member top portion has a plurality of longitudinally spaced hanger-receiving elements thereon and said arcuate lower portion has a plurality of longitudinally spaced hanger-receiving elements thereon for removably receiving and supporting a plurality of clothes hangers selectively on either said top portion or said arcuate lower portion.

9. The clothes hanger bracket according to claim 1 wherein
said rack member top portion has a transverse tubular portion intermediate the opposite ends thereof, and the bottom ends of said hook members are rotatably connected together through said tubular portion and rotate relative thereto such that said hook members rotate relative to one another and relative to said rack member.

* * * * *